March 12, 1946.  C. P. HULST  2,396,510
STEREOSCOPE
Filed Jan. 15, 1944   3 Sheets-Sheet 1
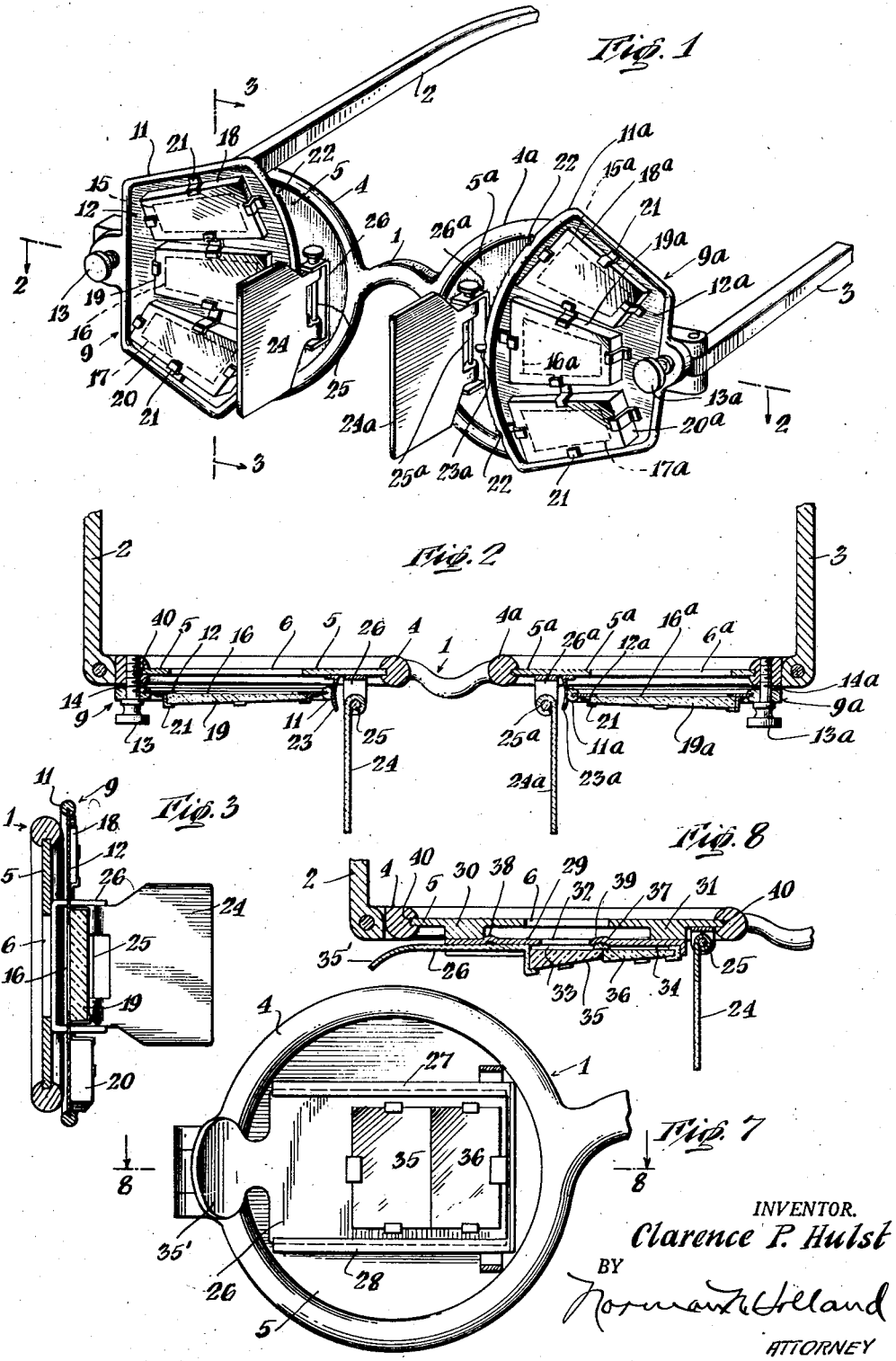
INVENTOR.
Clarence P. Hulst
BY
Norman K. Holland
ATTORNEY

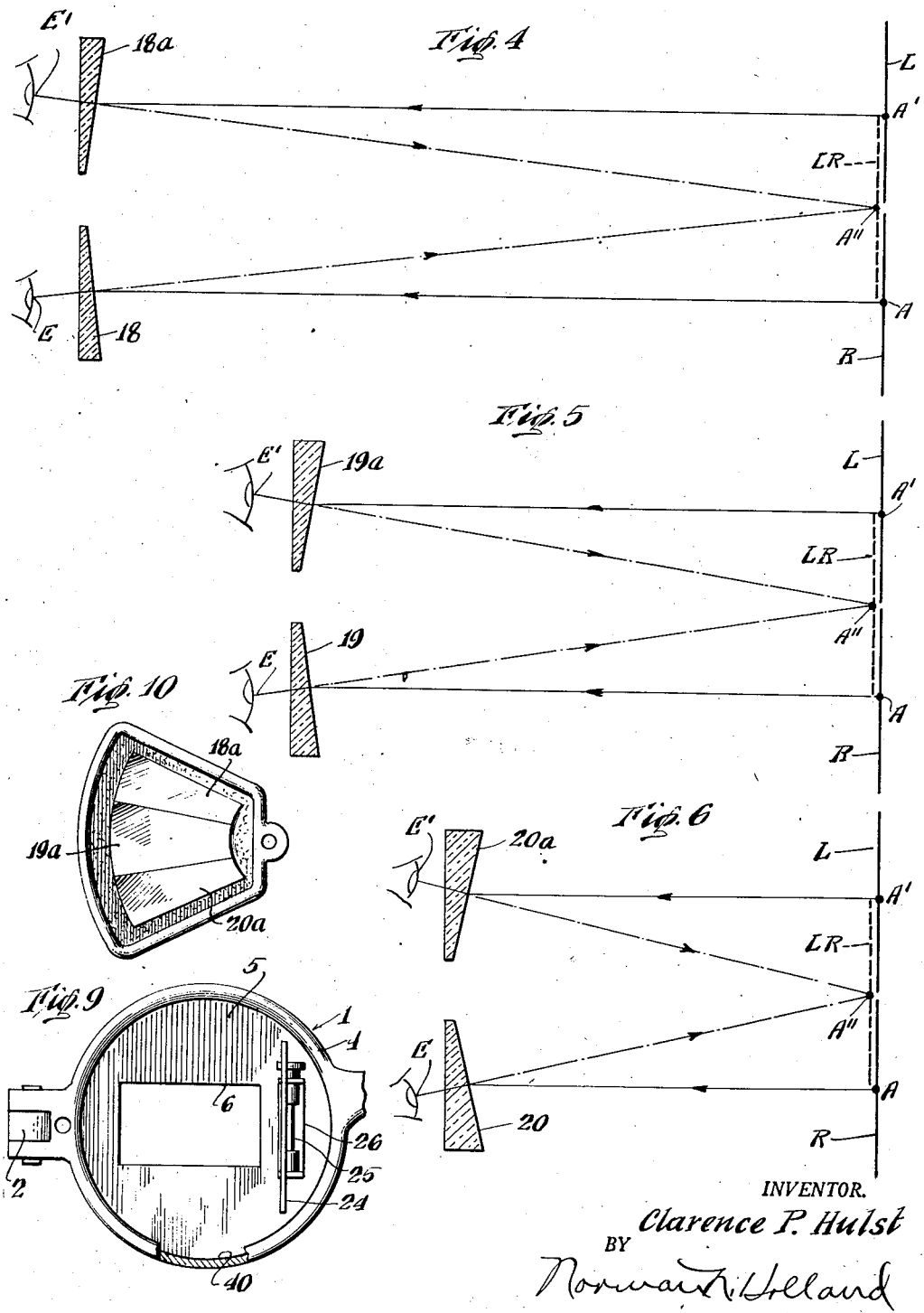

March 12, 1946.　　　C. P. HULST　　　2,396,510
STEREOSCOPE
Filed Jan. 15, 1944　　　3 Sheets-Sheet 3

INVENTOR.
Clarence P. Hulst
BY
Norman A. Holland
ATTORNEY

Patented Mar. 12, 1946

2,396,510

UNITED STATES PATENT OFFICE 2,396,510

STEREOSCOPE

Clarence P. Hulst, New York, N. Y.

Application January 15, 1944, Serial No. 518,460

6 Claims. (Cl. 88—29)

This invention relates to stereoscopes of the type useful for viewing stereoscopic picture pairs and has for its principal object to provide for superimposing the two pictures of the pair into visual coincidence.

It is well known that pictures, either moving or still, may be made in stereoscopic pairs by photographing the scene or object by each of a pair of cameras spaced some distance apart. When such stereoscopic pairs of pictures are placed side by side, they may be made to appear as one picture with the quality of visual depth, by viewing each of the pictures separately from the two eyes of the observer, through the lenses of a suitable stereoscope. Ordinarily, the picture pairs must be located at a predetermined fixed distance from the stereoscope to produce the required coincidence.

In accordance with the present invention, there is provided a stereoscope having refracting means proportioned in accordance with the distance of the pictures to produce the desired coincidence at the observer's eyes. A feature of the invention resides in the provision of means for adjusting the stereoscope to obtain the necessary coincidence even though the distance of the pictures from the stereoscope may vary.

The invention will be understood from the following detailed description considered in connection with the drawings, of which:

Fig. 1 is a perspective view of a stereoscope illustrating a preferred embodiment of the invention;

Fig. 2 is a horizontal cross-sectional view taken at line 2—2 of Fig. 1;

Fig. 3 is a vertical cross-sectional view taken at line 3—3 of Fig. 1;

Fig. 4 is an optical diagram showing the operation of the stereoscope;

Fig. 5 is another optical diagram which differs from that of Fig. 4 in showing the pictures closer to the stereoscope;

Fig. 6 is another optical diagram showing the pictures still closer to the stereoscope;

Fig. 7 is a partial view of a stereoscope embodying a modification of the invention;

Fig. 8 is a horizontal cross-sectional view taken at line 8—8 of Fig. 7;

Fig. 9 illustrates a further modification which may be made in the stereoscope;

Fig. 10 illustrates still another modification; and

Figure 11:
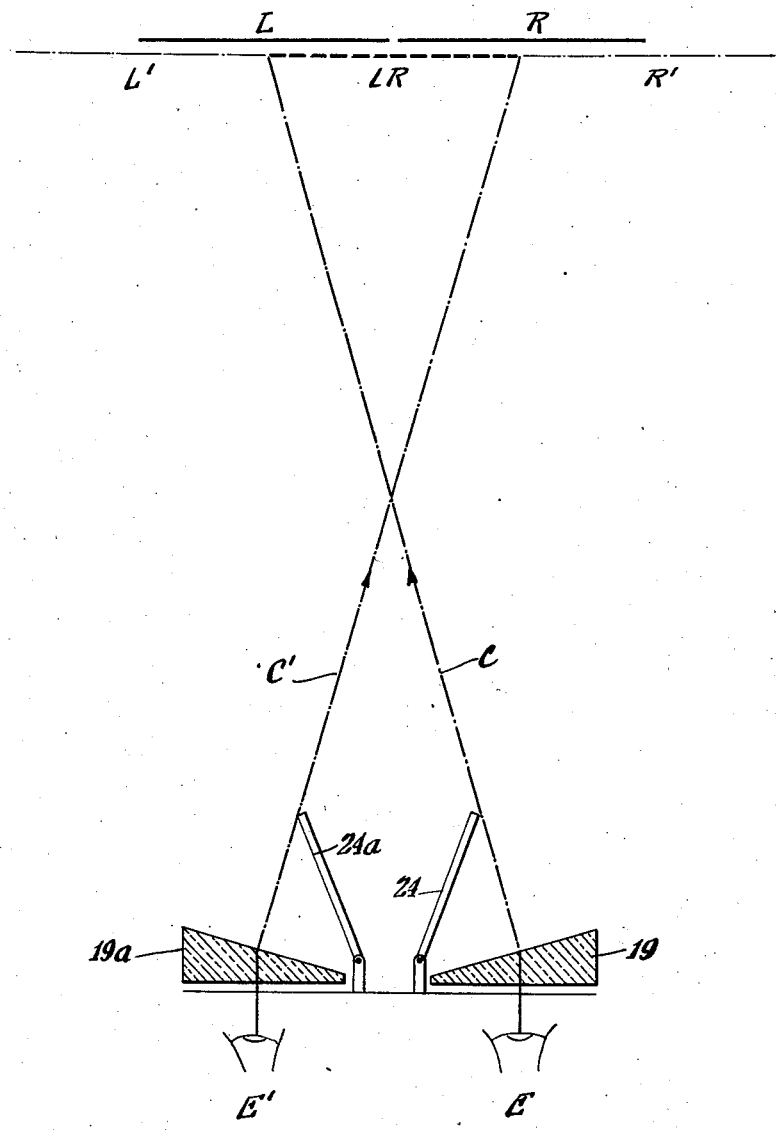
Fig. 11 is an optical diagram showing the function and operation of the shields.

The stereoscope shown in Figs. 1 to 3 is constructed in the form of spectacles to be worn by the observer. It comprises a frame 1 to which are pivoted the conventional ear members 2 and 3. Mounted within the circular rims 4 and 4a of the eyepieces are plates 5 and 5a respectively, which may be, for example, of thin brass or aluminum sheet which is preferably blackened. Centrally located in each of these plates are sight openings 6 and 6a through which visual observation is made. The openings are shown rectangular in shape, but it should be understood that a modification of this shape could be used instead.

There are mounted at the sides of the eyepiece rims, movable frames 9 and 9a respectively. These comprise respectively rims 11 and 11a which carry within them thin plates 12 and 12a which may be of blackened brass or aluminum sheet. The movable frames are arranged to pivot on respective studs 13 and 13a which are fastened to the main frame 1. The heads of the studs are recessed at 14 and 14a to receive the frames 9 and 9a in a friction fit such that the frames may be rotated by hand but will remain in the position where they are left. Each of the plates 12 and 12a is provided with a number of sight openings, three openings being shown. These are 15, 16, 17 and 15a, 16a, 17a respectively. The openings in the plate 12 and 12a are preferably of the same shape, although they may be smaller in size, as the openings 6 and 6a in the eyepiece. The openings are so arranged and situated that when the plates are rotated each of their three openings can be made successively to coincide with the respective eyepiece openings in fixed plates 5 and 5a.

Mounted over the three openings of the movable frames are respective prisms 18, 19 and 20, for one movable frame, and 18a, 19a and 20a for the other.

These prisms are held in position over their respective openings by means of fastening clips 21 which may be brazed to the plates 12 and 12a and bent over the prisms as shown. The three prisms of each frame have different angles of refraction, although the three prisms of the two frames should correspond with each other in optical characteristics. Thus the prisms 18, 19 and 20 are of different thickness and taper and the corresponding prisms 18a, 19a and 20a are similar in thickness and taper. The rims 11 and 11a are each preferably provided with three notches 22 located in relation to the respective prisms. These are adapted to engage corresponding spring detents 23 and 23a fastened to the respective plates 5 and 5a so that when the frames are rotated they can readily be snapped into position at the detents to provide for aligning the prisms respectively with the openings in the eyepieces.

The eyepieces are provided with respective vertical shields 24 and 24a which are rotatably adjustable about a vertical axis. For this purpose they are mounted on suitable pivot pins 25 and 25a, carried by U-shaped members 26 and 26a which may be brazed to the plates 5 and 5a.

The manner of using the stereoscope is to place one pair of corresponding prisms at the eyepiece openings 6 and 6a. In the drawings, prisms 19 and 19a are shown in this position. The particular pair of prisms to be selected will depend on the distance of the pictures from the stereoscope. The observer may make his shield adjustments by looking at the picture pairs and independently adjusting each of the shields 24 and 24a until he sees only one picture, which is in three dimensions.

The two pictures L and R (Fig. 11) are exposed to view side by side which have been taken by cameras from different points corresponding to the average interpupillary distance between the human eyes. The purpose of the prisms, as shown in Figs. 4, 5 and 6, is to bend the rays which reach the eyes from two individual pictures so that each picture is moved laterally toward each other a distance substantially equal to one-half its width. As a result, a center imaginary picture is formed which is a composite of the two pictures. Actually the eyes will see only the center imaginary picture which is in three dimensions, when the screens are positioned to cut off the two dimensional pictures at each side of center image.

The proper adjustment of the shields 24 and 24a is shown in Fig. 11, where the stereoscopic pair of pictures are shown at L and R, with L being the left picture and R the right picture. The shield 24 for prism 19 in front of the right eye E is adjusted to limit the vision of the right eye to the left side of the right picture as seen through the prism as shown by the line C. The shield 24a for the left eye E' and for prism 19a is adjusted to limit the vision of the left eye to the right side of left picture L as seen through the prism as shown by the line C'.

With prisms 19 and 19a having the proper angle of refraction, the right picture R will be moved to the left a distance equal to one half its width by the prism 19 and the left picture L will be moved to the right a distance equal to one-half its width by the prism 19a. As a result the two pictures R and L are superimposed into visual coincidence as shown at LR. The picture at LR will have visual depth, that is, three dimensions. Without the shields 24 and 24a, three pictures would be seen, namely the composite three-dimensional picture LR and the two two-dimensional pictures L' and R' indicated in dot-dash lines. When the shield 24 and 24a (Fig. 11) are properly adjusted, they prevent the pictures indicated at L' and R' from being seen.

Figs. 4, 5 and 6 illustrate further the optics involved. Fig. 4 illustrates the condition where the observer is at a considerable distance from the pictures, for example, near the back of a theater displaying stereoscopic motion pictures. For this purpose, there is used the pair of prisms 18 and 18a having the least optic refraction. For illustration, points A and A' indicate corresponding points on the two stereoscopic pictures which must be individually seen by the separate eyes and made to appear by the stereoscopic action as though they are located at a single point A''. The light ray from A striking prism 18 is refracted by the prism and seen by the eye at E and similarly the light ray from A' is seen with the left eye at E' after refraction by prism 18a. The effect is as though the right eye E were viewing point A directly from A'' and the left eye E' were viewing the corresponding point A' directly from the same point A''. In order to make the two corresponding points A and A' appear as though seen at the single point A'', it is necessary that the angles of refraction of the prisms vary with the distance of the pictures from the observer to produce this coincidence. The human eye has the power to adjust itself for minor variations, but if the variations are too great, coincidence will not be obtained. For example, if the observer were to move a substantial amount closer to the pictures as indicated in Fig. 5, the prisms 18 and 18a would no longer serve to produce coincidence, and the pictures would appear double unless the difference is within the range of eye accommodation. To provide for this closer distance, the observer would then rotate his movable frames 11 and 11a to bring the next higher power prism 19 and 19a into the eye position to produce the necessary coincidence. This condition might be that experienced at a central portion of a theater. Again, if the observer were still closer to the pictures as at the front of the theater, he would need the next pair of prisms 20 and 20a as illustrated in Fig. 6 to produce the necessary coincidence.

The construction of the stereoscope need not necessarily be as shown in Figs. 1 to 3. For example, Figs. 7 and 8 show a modification in which the prisms are adjusted by means of a slide instead of a rotating panel. The slide comprises a rigid sheet 26 shown rectangular in form and adapted to slide within a pair of grooves or guides 27 and 28 formed by bending the top and bottom edges of a sheet 29 over the edges of sheet 26. Sheet 29 may be attached, for example to two supports 30 and 31 which in turn are attached to the eyepiece member 5. The member 29 is provided with an opening 32 which coincides with the eyepiece opening. The sheet 26 is similarly provided with openings 33 and 34 from which are fastened respective prisms 35 and 36 of different refractive power. The end of sheet 26 may be shaped into the form of a handle 35' which may be readily grasped to slide it in its guides to move either of the prisms 35 or 36 into position at opening 32. To indicate when the prism is in its proper position, the member 26 may be provided with a protrusion 37 and the sheet 29 may be provided with corresponding indentations 38 and 39 so spaced that when protrusion 37 springs into one of the indentations a corresponding prism is properly positioned.

The invention is not limited to the specific forms described, but other variations are permissible, for example, the eyepiece members 5 and 5a may be made demountable as shown in Fig. 9 in which the rim 4 is shown provided with an internal annular groove 40 into which an aluminum disc 5 may be snapped.

Another possible variation is to make the movable prism supporting frames together with its prism of one integral piece as shown in Fig. 10. This may be done by molding it in one piece of a transparent plastic such as Plexiglas and preferably making the spaces between and around the prisms opaque. This simplifies the manufacture and reduces its cost. When the space between and around the prisms is opaque, either in the plastic glass or other construction, the eyepiece plates 5 and 5a may be dispensed with, if desired.

The advantages of stereoscopes in accordance with the invention will be apparent. A person so equipped may seat himself at any location in a theater where stereoscopic motion pictures are being displayed and move into the line of sight position the proper pair of prisms corresponding to his distance from the pictures. Proper adjustment of the shields in combination with the adjustable prisms will enable his eyes to view the pictures individually, and obtain a three-dimensional view of the picture which makes it realistic.

Persons who are color blind may utilize the invention to obtain the three dimensional effect. In view of the fact that the refractors are prisms, persons wearing glasses may use the stereoscope without removing their glasses.

In applying the invention to motion pictures, there would be little increased cost in photographing stereoscopic picture pairs and projecting them side by side on a screen. Patrons could be given stereoscopes in accordance with the present invention upon entering the theater, which would be returned to the usher on leaving. The patrons by adjustment of the stereoscope could view the picture from any position in the theater. If a person for some reason did not want to use the stereoscope, he could view one of the picture frames and enjoy the picture without the three-dimensional effect. Preferably, he would view the left frame of the pair if on the left side of the theater and the right frame if on the right side of the theater. Likewise a person blind in one eye may focus his vision on only one of the pair of pictures being projected.

Glasses having lenses of different colors have been used heretofore to view stereoscopic picture pairs, which is ordinarily referred to as "color absorption." Such lenses absorb an enormous proportion of the light and are objectionable for that reason alone. Also, a person blind in one eye or having defective vision in one eye would not be able to view such pictures, nor would a person who is color blind.

A greater percentage of pictures are being made yearly in "technicolor." The developments in this field indicate that they will eventually supplant black and white pictures in the moving picture field. The present invention will work preferably with "technicolor" pictures without affecting the colors in any way. Any process utilizing color absorption with "technicolor" pictures could not be used as it would naturally absorb the colors in addition to absorbing a large amount of light.

Polarized lenses have also been used but they too absorb a substantial amount of light and are objectionable for this reason and are not suitable for "technicolor" pictures. In addition, the film required is expensive and not yet perfected.

It will be seen that the present invention provides a simple and inexpensive means for viewing stereoscopic pairs of pictures to obtain a three-dimensional view of the scenes portrayed. The operation of the stereoscope is not affected by color blindness or by the wearing of glasses for defective vision. The low cost of the device permits the theater owner to furnish it to his patron or each patron may buy his own at a nominal cost. The device is rugged in construction and fully capable of withstanding the rough usage to which it may be subjected.

As various changes may be made in the form, construction and arrangement of the parts herein without departing from the scope and spirit of the invention and without sacrificing any of its advantages, it is to be understood that all matter herein is to be interpreted as illustrative and not in a limiting sense.

Having thus described my invention, I claim:

1. An eyeglass frame for viewing stereoscopic picture pairs which may be located at different distances from the viewer, said eyeglass frame having a pair of movable prism supports, one for each eye of an observer, each support carrying a plurality of prisms of different refractive power fixed to the support in side by side relation and movable as a unit successively into and out of the line of sight, the individual prisms of one support having the same refractive power as the corresponding prisms of the other support, whereby the corresponding power prisms of the two supports may be moved into the line of sight of the respective eyes independently, adjustable shields for allowing each prism in the line of sight to view a different one only of said pair of pictures.

2. An eyeglass frame for viewing stereoscopic picture pairs which may be located at different distances from the viewer, said eyeglass frame comprising a pair of prism supports rotatably mounted adjacent the ends of the frame, one for each eye of the observer, each support carrying a plurality of prisms of different refractive power, said supports being rotatable about their mounting axis to permit movement of corresponding power prisms of the two supports into the line of sight of the respective eyes, and shielding means adjustably mounted adjacent the middle of the frame for allowing each prism to view a different one only of said pair of pictures.

3. An eyeglass frame according to claim 2 in which the prisms decrease in width from one end to the other in the direction of their length.

4. An eyeglass frame for viewing stereoscopic picture pairs which may be located at different distances from the viewer, having a pair of prism supports rotatably mounted adjacent the ends of the frame, each support carrying a plurality of prisms of different refraction angles, the individual prisms of one support having the same refraction angle as the corresponding power prisms of the other support, detent means for holding the supports in the positions in which the corresponding prisms are in the line of sight, and adjustable shields for allowing the eye for each prism to view a different one only of said pair of pictures.

5. An eyeglass frame for viewing stereoscopic picture pairs which may be located at different distances from the viewer, said eyeglass frame comprising a pair of eyepieces, one for each eye of an observer, guide means fastened to each eyepiece, a prism support slidable in each guide, and a plurality of prisms in each support in side by side relation and movable as a unit, the individual prisms of one support having the same refractive angle as corresponding power prisms of the other support, means for moving the corresponding power prisms of the two supports successively into the line of sight of the respective eyes, and shielding means for allowing the eyes for each prism in the line of sight to view a different one only of said pair of pictures.

6. An eyeglass frame according to claim 1 in which said prism members are made of a single piece of material.

CLARENCE P. HULST.